(12) United States Patent
Hirano

(10) Patent No.: US 9,712,064 B2
(45) Date of Patent: Jul. 18, 2017

(54) PROTECTION CIRCUITRY FOR POWER CONVERSION DEVICE AND POWER CONVERSION METHOD USING THE SAME

(71) Applicant: TOYOTA JIDOSHA KABUSHIKI KAISHA, Toyota-shi, Aichi-ken (JP)

(72) Inventor: Takahiro Hirano, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 3 days.

(21) Appl. No.: 14/614,556

(22) Filed: Feb. 5, 2015

(65) Prior Publication Data

US 2015/0229217 A1      Aug. 13, 2015

(30) Foreign Application Priority Data

Feb. 7, 2014   (JP) .................. 2014-022753

(51) Int. Cl.
*H02M 3/335*   (2006.01)
*H02M 1/32*    (2007.01)

(52) U.S. Cl.
CPC ......... *H02M 3/33507* (2013.01); *H02M 1/32* (2013.01); *H02M 3/33553* (2013.01); *H02M 3/33561* (2013.01); *H02M 3/33584* (2013.01)

(58) Field of Classification Search
CPC ......... H02M 3/33507; H02M 3/33553; H02M 3/33584; H02M 1/32
See application file for complete search history.

(56) References Cited

U.S. PATENT DOCUMENTS

2011/0198933 A1    8/2011  Ishigaki et al.
2014/0159491 A1    6/2014  Kusunose
2015/0270701 A1*   9/2015  Cambefort ........ H02M 3/33546
                                                363/50

FOREIGN PATENT DOCUMENTS

JP      2011-193713 A    9/2011
JP      2013027207 A     2/2013

OTHER PUBLICATIONS

K. Itoh, M. Ishigaki, N. Yanagizawa, S. Tomura and T. Umeno, "Analysis and design of a multi-port converter using a magnetic coupling inductor technique," 2013 IEEE Energy Conversion Congress and Exposition, Denver, CO, 2013, pp. 4713-4718.*

* cited by examiner

*Primary Examiner* — Harry Behm
*Assistant Examiner* — Peter Novak
(74) *Attorney, Agent, or Firm* — Andrews Kurth Kenyon LLP

(57) ABSTRACT

A power conversion method of a power conversion device including a primary-side port disposed in a primary-side circuit and a secondary-side port disposed in a secondary-side circuit magnetically coupled to the primary-side circuit with a transformer is provided, in which transmission power transmitted between the primary-side circuit and the secondary-side circuit is adjusted by changing a phase difference between switching of the primary-side circuit and switching of the secondary-side circuit. The power conversion method includes: determining whether the phase difference is zero; stopping transmission of electric power from the secondary-side circuit to the primary-side circuit when the phase difference is zero, the voltage of the primary-side port is equal to or greater than the first specified value, and the voltage of the secondary-side port is greater than the second specified value.

14 Claims, 5 Drawing Sheets

PROTECTION CIRCUITRY FOR POWER CONVERSION DEVICE AND POWER CONVERSION METHOD USING THE SAME

INCORPORATION BY REFERENCE

The disclosure of Japanese Patent Application No. 2014-022753 filed on Feb. 7, 2014 including the specification, drawings and abstract is incorporated herein by reference in its entirety.

BACKGROUND OF THE INVENTION

1. Field of the Invention

The present invention relates to a power conversion device and a power conversion method.

2. Description of Related Art

A power conversion device is known which adjusts transmission power transmitted between a primary-side conversion circuit including plural primary-side ports and a secondary-side conversion circuit including plural secondary-side ports and being magnetically coupled to the primary-side conversion circuit with a transformer depending on two types of control parameters (a phase difference $\phi$ and a duty ratio D) (for example, see Japanese Patent Application Publication No. 2011-193713 (JP 2011-193713 A)).

However, when the voltage of the secondary-side port is greater than a predetermined value in a no-load state (state in which no current flows in the primary-side port), there is a possibility that power will be transmitted from the secondary-side conversion circuit to the primary-side conversion circuit and the voltage of the primary-side port will become greater than a specified value.

SUMMARY OF THE INVENTION

Therefore, an aspect of the invention provides a power conversion device and a power conversion method which can prevent the voltage of a primary-side port from departing from a specified value.

According to an aspect of the invention, there is provided a power conversion method of a power conversion device including a primary-side port disposed in a primary-side circuit and a secondary-side port disposed in a secondary-side circuit magnetically coupled to the primary-side circuit with a transformer, the power conversion device adjusting transmission power transmitted between the primary-side circuit and the secondary-side circuit by changing a phase difference between switching of the primary-side circuit and switching of the secondary-side circuit, the power conversion method including: determining whether the phase difference is zero; determining whether the voltage of the primary-side port is equal to or greater than a first specified value; determining whether the voltage of the secondary-side port is greater than a second specified value; and stopping transmission of electric power from the secondary-side circuit to the primary-side circuit when the phase difference is zero, the voltage of the primary-side port is equal to or greater than the first specified value, and the voltage of the secondary-side port is greater than the second specified value.

According to the aspect of the invention, it is possible to prevent the voltage of the primary-side port from departing from a specified value.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Configuration of Power Supply Device 101

Figure 1:
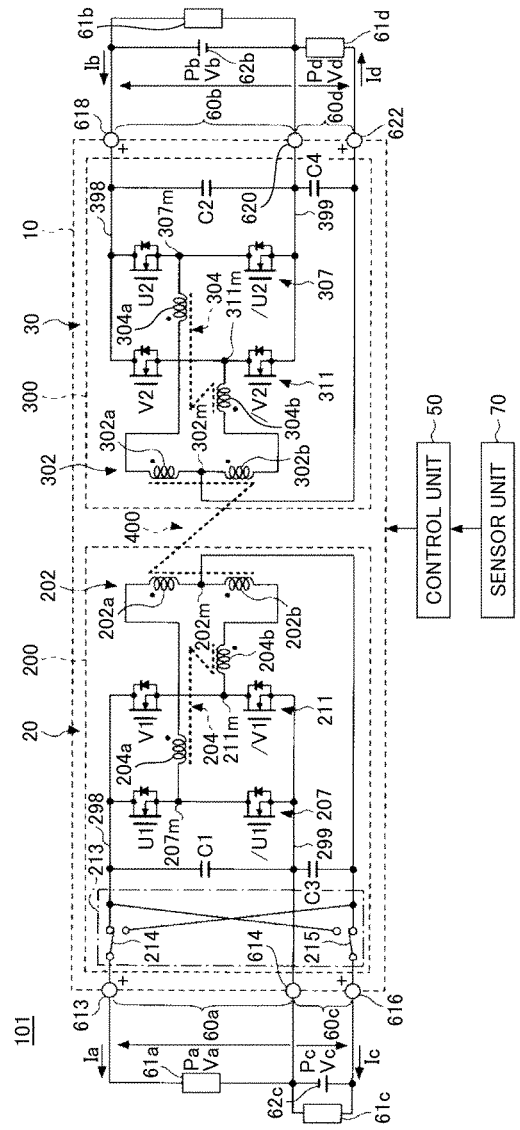
FIG. 1 is a diagram illustrating a configuration example of a power conversion device.

FIG. 1 is a block diagram illustrating a configuration example of a power supply device 101 as an embodiment of a power conversion device. The power supply device 101 is, for example, a power supply system including a power supply circuit 10, a control unit 50, and a sensor unit 70. The power supply device 101 is a system that is mounted on a vehicle such as an automobile and that distributes power to in-vehicle loads. Specific examples of the vehicle include a hybrid vehicle, a plug-in hybrid vehicle, and an electric automobile.

The power supply device 101 includes a first input and output port 60a connected to a primary-side high-voltage load (for example, an electric power steering device (EPS)) 61a and a second input and output port 60c connected to a primary-side low-voltage load (for example, an electronic control unit (ECU) and an electronic control brake system (ECB)) 61c and a primary-side low-voltage power supply (for example, an auxiliary battery) 62c as primary-side ports. The primary-side low-voltage power supply 62c supplies power to the primary-side low-voltage load 61c operating in the same voltage system (for example, 12 V system) as the primary-side low-voltage power supply 62c. The primary-side low-voltage power supply 62c supplies power, which has been stepped up by a primary-side conversion circuit 20 disposed in the power supply circuit 10, to the primary-side high-voltage load 61a operating in a voltage system (for example, 48 V system higher than the 12 V system) different from the primary-side low-voltage power supply 62c. A specific example of the primary-side low-voltage power supply 62c is a secondary battery such as a lead battery.

The power supply device 101 includes a third input and output port 60b connected to a secondary-side high-voltage load 61b and a secondary-side high-voltage power supply (for example, a main battery) 62b and a fourth input and output port 60d connected to a secondary-side low-voltage load 61d as secondary-side ports. The secondary-side high-voltage power supply 62b supplies power to the secondary-side high-voltage load 61b operating in the same voltage system (for example, 288 V system higher than the 12 V system and the 48 V system) as the secondary-side high-voltage power supply 62b. The secondary-side high-voltage power supply 62b supplies power, which has been stepped down by a secondary-side conversion circuit 30 disposed in the power supply circuit 10, to the secondary-side low-voltage load 61d operating in a voltage system (for example, 72 V system lower than the 288 V system) different from the secondary-side high-voltage power supply 62b. A specific example of the secondary-side high-voltage power supply 62b is a secondary battery such as a lithium ion battery.

The power supply circuit 10 is a power conversion circuit that includes the aforementioned four input and output ports and that has a function of selecting two input and output ports out of the four input and output ports and performing power conversion between the selected two input and output ports. The power supply device 101 including the power supply circuit 10 may be a device that includes three or more input and output ports and that can convert power between two input and output ports out of the three or more input and output ports. For example, the power supply circuit 10 may be, for example, a circuit that includes three input and output ports other than the fourth input and output port 60d.

Port power Pa, Pc, Pb, Pd are input and output power (input power or output power) at the first input and output port 60a, the second input and output port 60c, the third input and output port 60b, and the fourth input and output port 60d. Port voltages Va, Vc, Vb, Vd are input and output voltages (an input voltage or an output voltage) at the first input and output port 60a, the second input and output port 60c, the third input and output port 60b, and the fourth input and output port 60d. Port currents Ia, Ic, Ib, Id are input and output currents (an input current or an output current) at the first input and output port 60a, the second input and output port 60c, the third input and output port 60b, and the fourth input and output port 60d.

The power supply circuit 10 includes a capacitor C1 disposed at the first input and output port 60a, a capacitor C3 disposed at the second input and output port 60c, a capacitor C2 disposed at the third input and output port 60b, and a capacitor C4 disposed at the fourth input and output port 60d. Specific examples of the capacitors C1, C2, C3, C4 include a film capacitor, an aluminum electrolytic capacitor, a ceramic capacitor, and a solid polymer capacitor.

The capacitor C1 is inserted between a high-potential terminal 613 of the first input and output port 60a and a low-potential terminal 614 of the first input and output port 60a and the second input and output port 60c. The capacitor C3 is inserted between a high-potential terminal 616 of the second input and output port 60c and the low-potential terminal 614 of the first input and output port 60a and the second input and output port 60c. The capacitor C2 is inserted between a high-potential terminal 618 of the third input and output port 60b and a low-potential terminal 620 of the third input and output port 60b and the fourth input and output port 60d. The capacitor C4 is inserted between a high-potential terminal 622 of the fourth input and output port 60d and the low-potential terminal 620 of the third input and output port 60b and the fourth input and output port 60d.

The capacitors C1, C2, C3, C4 may be disposed inside the power supply circuit 10 or may be disposed outside the power supply circuit 10.

The power supply circuit 10 is a power conversion circuit including the primary-side conversion circuit 20 and the secondary-side conversion circuit 30. The primary-side conversion circuit 20 and the secondary-side conversion circuit 30 are connected to each other via a primary-side magnetic coupling reactor 204 and a secondary-side magnetic coupling reactor 304 and are magnetically coupled with a transformer 400 (center-tap transformer). The primary-side ports including the first input and output port 60a and the second input and output port 60c and the secondary-side ports including the third input and output port 60b and the fourth input and output port 60d are connected to each other via the transformer 400.

The primary-side conversion circuit 20 is a primary-side circuit including a primary-side full-bridge circuit 200, the first input and output port 60a, and the second input and output port 60c. The primary-side full-bridge circuit 200 is a primary-side power conversion unit including a primary-side coil 202 of the transformer 400, the primary-side magnetic coupling reactor 204, a primary-side first upper arm U1, a primary-side first lower arm /U1, a primary-side second upper arm V1, and a primary-side second lower arm /V1. Here, the primary-side first upper arm U1, the primary-side first lower arm /U1, the primary-side second upper arm V1, and the primary-side second lower arm /V1 are, for example, switching elements including an N-channel MOSFET and a body diode as a parasitic element of the MOSFET. A diode may be additionally connected in parallel to the MOSFET.

The primary-side full-bridge circuit 200 includes a primary-side positive bus bar 298 connected to the high-potential terminal 613 of the first input and output ports 60a and a primary-side negative bus bar 299 connected to the low-potential terminal 614 of the first input and output port 60a and the second input and output port 60c.

A primary-side first arm circuit 207 in which the primary-side first upper arm U1 and the primary-side first lower arm /U1 are connected in series is disposed between the primary-side positive bus bar 298 and the primary-side negative bus bar 299. The primary-side first arm circuit 207 is a primary-side first power conversion circuit unit (primary-side U-phase power conversion circuit unit) that can perform a power conversion operation by ON/OFF switching operations of the primary-side first upper arm U1 and the primary-side first lower arm /U1. A primary-side second arm circuit 211 in which the primary-side second upper arm V1 and the primary-side second lower arm /V1 are connected in series is disposed in parallel to the primary-side first arm circuit 207 between the primary-side positive bus bar 298 and the primary-side negative bus bar 299. The primary-side second arm circuit 211 is a primary-side second power conversion circuit unit (primary-side V-phase power conversion circuit unit) that can perform a power conversion operation by ON/OFF switching operations of the primary-side second upper arm V1 and the primary-side second lower arm /V1.

A bridge part connecting a midpoint 207m of the primary-side first arm circuit 207 and a midpoint 211m of the primary-side second arm circuit 211 is provided with the primary-side coil 202 and the primary-side magnetic coupling reactor 204. The connection relationship of the bridge part will be described below in more detail. The midpoint 207m of the primary-side first arm circuit 207 is connected to one end of a primary-side first reactor 204a of the primary-side magnetic coupling reactor 204. The other end of the primary-side first reactor 204a is connected to one end of the primary-side coil 202. The other end of the primary-side coil 202 is connected to one end of a primary-side second reactor 204b of the primary-side magnetic coupling reactor 204. The other end of the primary-side second reactor 204b is connected to the midpoint 211m of the primary-side second arm circuit 211. The primary-side magnetic coupling reactor 204 includes the primary-side first reactor 204a and the primary-side second reactor 204b magnetically coupled to the primary-side first reactor 204a with a coupling coefficient k1.

The midpoint 207m is a primary-side first intermediate node between the primary-side first upper arm U1 and the primary-side first lower arm /U1, and the midpoint 211m is a primary-side second intermediate node between the primary-side second upper arm V1 and the primary-side second lower arm /V1.

The first input and output port 60a is a port disposed between the primary-side positive bus bar 298 and the primary-side negative bus bar 299. The first input and output port 60a includes the terminal 613 and the terminal 614. The second input and output port 60c is a port disposed between the primary-side negative bus bar 299 and the center tap 202m of the primary-side coil 202. The second input and output port 60c includes the terminal 614 and the terminal 616.

The port voltage Va of the first input and output port 60a and the port voltage Vc of the second input and output port 60c vary depending on the voltage of the primary-side low-voltage power supply 62c.

The center tap 202m is connected to the high-potential terminal 616 of the second input and output port 60c. The center tap 202m is an intermediate connecting point between a primary-side first winding 202a and a primary-side second winding 202b disposed in the primary-side coil 202.

The secondary-side conversion circuit 30 is a secondary-side circuit including a secondary-side full-bridge circuit 300, the third input and output port 60b, and the fourth input and output port 60d. The secondary-side full-bridge circuit 300 is a secondary-side power conversion unit including a secondary-side coil 302 of the transformer 400, the secondary-side magnetic coupling reactor 304, a secondary-side first upper arm U2, a secondary-side first lower arm /U2, a secondary-side second upper arm V2, and a secondary-side second lower arm /V2. Here, the secondary-side first upper arm U2, the secondary-side first lower arm /U2, the secondary-side second upper arm V2, and the secondary-side second lower arm /V2 are, for example, switching elements including an N-channel MOSFET and a body diode as a parasitic element of the MOSFET. A diode may be additionally connected in parallel to the MOSFET.

The secondary-side full-bridge circuit 300 includes a secondary-side positive bus bar 398 connected to the high-potential terminal 618 of the third input and output ports 60b and a secondary-side negative bus bar 399 connected to the low-potential terminal 620 of the third input and output port 60b and the fourth input and output port 60d.

A secondary-side first arm circuit 307 in which the secondary-side first upper arm U2 and the secondary-side first lower arm /U2 are connected in series is disposed between the secondary-side positive bus bar 398 and the secondary-side negative bus bar 399. The secondary-side first arm circuit 307 is a secondary-side first power conversion circuit unit (secondary-side U-phase power conversion circuit unit) that can perform a power conversion operation by ON/OFF switching operations of the secondary-side first upper arm U2 and the secondary-side first lower arm /U2. A secondary-side second arm circuit 311 in which the secondary-side second upper arm V2 and the secondary-side second lower arm /V2 are connected in series is disposed in parallel to the secondary-side first arm circuit 307 between the secondary-side positive bus bar 398 and the secondary-side negative bus bar 399. The secondary-side second arm circuit 311 is a secondary-side second power conversion circuit unit (secondary-side V-phase power conversion circuit unit) that can perform a power conversion operation by ON/OFF switching operations of the secondary-side second upper arm V2 and the secondary-side second lower arm /V2.

A bridge part connecting a midpoint 307m of the secondary-side first arm circuit 307 and a midpoint 311m of the secondary-side second arm circuit 311 is provided with the secondary-side coil 302 and the secondary-side magnetic coupling reactor 304. The connection relationship of the bridge part will be described below in more detail. The midpoint 307m of the secondary-side first arm circuit 307 is connected to one end of a secondary-side first reactor 304a of the secondary-side magnetic coupling reactor 304. The other end of the secondary-side first reactor 304a is connected to one end of the secondary-side coil 302. The other end of the secondary-side coil 302 is connected to one end of a secondary-side second reactor 304b of the secondary-side magnetic coupling reactor 304. The other end of the secondary-side second reactor 304b is connected to the midpoint 311m of the secondary-side second arm circuit 311. The secondary-side magnetic coupling reactor 304 includes the secondary-side first reactor 304a and the secondary-side second reactor 304b magnetically coupled to the secondary-side first reactor 304a with a coupling coefficient k2.

The midpoint 307m is a secondary-side first intermediate node between the secondary-side first upper arm U2 and the secondary-side first lower arm /U2, and the midpoint 311m is a secondary-side second intermediate node between the secondary-side second upper arm V2 and the secondary-side second lower arm /V2.

The third input and output port 60b is a port disposed between the secondary-side positive bus bar 398 and the secondary-side negative bus bar 399. The third input and output port 60b includes the terminal 618 and the terminal 620. The fourth input and output port 60d is a port disposed between the secondary-side negative bus bar 399 and the center tap 302m of the secondary-side coil 302. The fourth input and output port 60d includes the terminal 620 and the terminal 622.

The port voltage Vb of the third input and output port 60a and the port voltage Vd of the fourth input and output port 60d vary depending on the voltage of the secondary-side low-voltage power supply 62b.

The center tap 302m is connected to the high-potential terminal 622 of the fourth input and output port 60d. The center tap 302m is an intermediate connecting point between a secondary-side first winding 302a and a secondary-side second winding 302b disposed in the secondary-side coil 302.

In FIG. 1, the power supply device 101 includes a sensor unit 70. The sensor unit 70 is a detection unit that detects an input and output value Y at at least one of the first to fourth input and output ports 60a, 60c, 60b, 60d with a predetermined detection cycle and that outputs a detected value Yd corresponding to the detected input and output value Y to the control unit 50. The detected value Yd may be a detected voltage obtained by detecting an input and output voltage, a detected current obtained by detecting an input and output current, or may be detected power obtained by detecting input and output power. The sensor unit 70 may be disposed inside the power supply circuit 10 or may be disposed outside the power supply circuit 10.

The sensor unit 70 includes, for example, a voltage detecting unit that detects an input and output voltage generated in at least one port of the first to fourth input and output ports 60a, 60c, 60b, 60d. The sensor unit 70 includes, for example, a primary-side voltage detecting unit that outputs the detected voltage of at least one of the input output voltage Va and the input and output voltage Vc as a primary-side detected voltage value and a secondary-side voltage detecting unit that outputs the detected voltage of at least one of the input and output voltage Vb and the input and output voltage Vd as a secondary-side detected voltage value.

The voltage detecting unit of the sensor unit 70 includes, for example, a voltage sensor that monitors the input and output voltage value of at least one port and a voltage detection circuit that outputs a detected voltage corresponding to the input and output voltage value monitored by the voltage sensor to the control unit 50.

The sensor unit 70 includes, for example, a current detecting unit that detects an input and output current flowing in at least one port of the first to fourth input and output ports 60*a*, 60*c*, 60*b*, 60*d*. The sensor unit 70 includes a primary-side current detecting unit that outputs the detected current of at least one of the input and output current Ia and the input and output current Ic as a primary-side detected current value and a secondary-side current detecting unit that outputs the detected current of at least one of the input and output current Ib and the input and output current Id as a secondary-side detected current value.

The current detecting unit of the sensor unit 70 includes, for example, a current sensor that monitors the input and output current value of at least one port and a current detection circuit that outputs a detected current corresponding to the input and output current value monitored by the current sensor to the control unit 50.

The power supply device 101 includes the control unit 50. The control unit 50 is, for example, an electronic circuit including a micro computer having a CPU built therein. The control unit 50 may be disposed inside the power supply circuit 10 or may be disposed outside the power supply circuit 10.

The control unit 50 controls the power conversion operation performed by the power supply circuit 10 in a feedback manner by changing the value of a predetermined control parameter X, and can adjust the input and output values Y at the first to fourth input and output ports 60*a*, 60*c*, 60*b*, 60*d* of the power supply circuit 10. Examples of the main control parameter X include two types of control parameters of a phase difference φ and a duty ratio D (on-time δ).

The phase difference φ is a difference in switching timing (time lag) between the power conversion circuit units of the same phase in the primary-side full-bridge circuit 200 and the secondary-side full-bridge circuit 300. The duty ratio (on-time δ) is a duty ratio (on-time) of a switching waveform in the power conversion circuit units in the primary-side full-bridge circuit 200 and the secondary-side full-bridge circuit 300.

These two control parameters X can be controlled independently of each other. The control unit 50 changes the input and output values Y at the input and output ports of the power supply circuit 10 by duty ratio control and/or phase control of the primary-side full-bridge circuit 200 and the secondary-side full-bridge circuit 300 using the phase difference φ and the duty ratio D (on-time δ).

The control unit 50 controls the power conversion operation of the power supply circuit 10 in a feedback manner so that the detected value Yd of the input and output value Y in at least one port of the first to fourth input and output ports 60*a*, 60*c*, 60*b*, 60*d* converges on a target value Yo set at the port. The target value Yo is a command value set by the control unit 50 or a predetermined device other than the control unit 50, for example, on the basis of drive conditions defined for each load (for example, the primary-side low-voltage load 61*c*) connected to the respective input and output ports. The target value Yo serves as an output target value when electric power is output from the port, serves as an input target value when electric power is input to the port, and may be a target voltage value, may be a target current value, or may be a target power value.

The control unit 50 controls the power conversion operation of the power supply circuit 10 in a feedback manner so that transmission power P transmitted via the transformer 400 between the primary-side conversion circuit 20 and the secondary-side conversion circuit 30 converges on preset target transmission power. The transmission power is also referred to as an amount of power transmitted. The target transmission power is a command value set by the control unit 50 or a predetermined device other than the control unit 50, for example, on the basis of the difference between the detected value Yd and the target value Yo at a certain port.

The control unit 50 detects the port voltage Va and the port voltage Vb, monitors the relationship between a turns ratio N of the transformer 400 and a voltage ratio M (ratio of the port voltage Va and the port voltage Vb), sets gains (for example, x and y), and controls the transmission power transmitted between the primary-side conversion circuit 20 and the secondary-side conversion circuit 30. For example, when the relationship between the turns ratio N and the voltage ratio M collapses in a no-load state and thus electric power is generated regardless of the phase difference φ (electric power is transmitted from the secondary-side conversion circuit to the primary-side conversion circuit), the control unit 50 stops the transmission of electric power from the secondary-side conversion circuit to the primary-side conversion circuit. Accordingly, the power supply device 101 can prevent the port voltage Va from departing from a specified value.

When the transmission of electric power from the secondary-side conversion circuit 30 to the primary-side conversion circuit 20 is stopped, the control unit 50 switches a step-down operation from the first input and output port 60*a* to the second input and output port 60*c* to a step-up operation from the second input and output port 60*c* to the first input and output port 60*a*. Accordingly, it is possible to prevent the port voltage Va from decreasing due to self discharging or the like at the first input and output port 60*a*.

Figure 2:
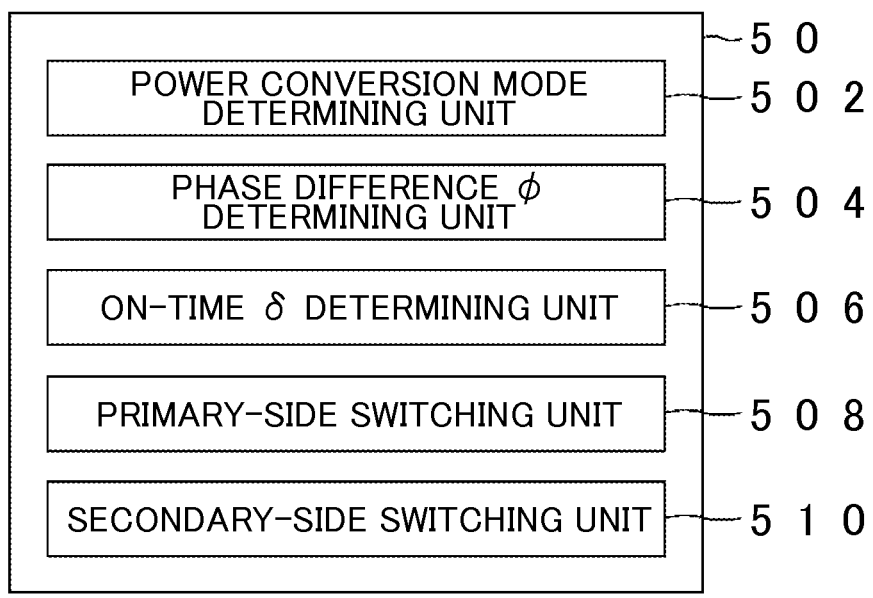
FIG. 2 is a block diagram illustrating a configuration example of a control unit.

FIG. 2 is a block diagram of the control unit 50. The control unit 50 is a control unit having a function of controlling switching of the switching elements such as the primary-side first upper arm U1 of the primary-side conversion circuit 20 and the switching elements such as the secondary-side first upper arm U2 of the secondary-side conversion circuit 30. The control unit 50 includes a power conversion mode determining unit 502, a phase difference φ determining unit 504, an on-time δ determining unit 506, a primary-side switching unit 508, and a secondary-side switching unit 510. The control unit 50 is, for example, an electronic circuit including a micro computer having a CPU built therein.

The power conversion mode determining unit 502 selects and determines an operation mode out of power conversion modes A to L, which will be described below, of the power supply circuit 10, for example, on the basis of a predetermined external signal (for example, a signal indicating a difference between the detected value Yd and the target value Yo at a certain port). The power conversion modes include mode A in which electric power input from the first input and output port 60*a* is converted and output to the second input and output port 60*c*, mode B in which electric power input from the first input and output port 60*a* is converted and output to the third input and output port 60*b*, and mode C in which electric power input from the first input and output port 60*a* is converted and output to the fourth input and output port 60*d*.

The power conversion modes include mode D in which electric power input from the second input and output port 60*c* is converted and output to the first input and output port 60*a*, mode E in which electric power input from the second input and output port 60*c* is converted and output to the third input and output port 60*b*, and mode F in which electric power input from the second input and output port 60c is converted and output to the fourth input and output port 60d.

The power conversion modes include mode G in which electric power input from the third input and output port 60b is converted and output to the first input and output port 60a, mode H in which electric power input from the third input and output port 60b is converted and output to the second input and output port 60c, and mode I in which electric power input from the third input and output port 60b is converted and output to the fourth input and output port 60d.

The power conversion modes include mode J in which electric power input from the fourth input and output port 60d is converted and output to the first input and output port 60a, mode K in which electric power input from the fourth input and output port 60d is converted and output to the second input and output port 60c, and mode L in which electric power input from the fourth input and output port 60d is converted and output to the third input and output port 60b.

The phase difference φ determining unit 504 has a function of setting the phase difference φ of periodic switching movement of the switching elements between the primary-side conversion circuit 20 and the secondary-side conversion circuit 30 so as to cause the power supply circuit 10 to serve as a DC-DC converter circuit.

The on-time δ determining unit 506 has a function of setting the on-time δ of the switching elements of the primary-side conversion circuit 20 and the secondary-side conversion circuit 30 so as to cause the primary-side conversion circuit 20 and the secondary-side conversion circuit 30 to serve as step-up/down circuits, respectively.

The primary-side switching unit 508 has a function of controlling switching of the switching elements of the primary-side first upper arm U1, the primary-side first lower arm /U1, the primary-side second upper arm V1, and the primary-side second lower arm /V1 on the basis of the outputs of the power conversion mode determining unit 502, the phase difference φ determining unit 504, and the on-time δ determining unit 506.

The secondary-side switching unit 510 has a function of controlling switching of the switching elements of the secondary-side first upper arm U2, the secondary-side first lower arm /U2, the secondary-side second upper arm V2, and the secondary-side second lower arm /V2 on the basis of the outputs of the power conversion mode determining unit 502, the phase difference φ determining unit 504, and the on-time δ determining unit 506.

The control unit 50 is not limited to the processes illustrated in FIG. 2 and can perform various processes required for controlling the transmission power transmitted between the primary-side conversion circuit 20 and the secondary-side conversion circuit 30.

Operation of Power Supply Device 101

The operation of the power supply device 101 will be described below with reference to FIGS. 1 and 2. For example, when an external signal for requiring for selecting mode F as the power conversion mode of the power supply circuit 10 is input, the power conversion mode determining unit 502 of the control unit 50 determines the power conversion mode of the power supply circuit 10 to be mode F. At this time, the voltage input to the second input and output port 60c is stepped up by the step-up function of the primary-side conversion circuit 20, the power of the stepped-up voltage is transmitted to the third input and output port 60b by the function as the DC-DC converter circuit of the power supply circuit 10, the transmitted power is stepped down by the step-down function of the secondary-side conversion circuit 30, and the stepped-down voltage is output from the fourth input and output port 60d.

The step-up/down function of the primary-side conversion circuit 20 will be described below in detail. Paying attention to the second input and output port 60c and the first input and output port 60a, the terminal 616 of the second input and output port 60c is connected to the midpoint 207m of the primary-side first arm circuit 207 via the primary-side first winding 202a and the primary-side first reactor 204a connected in series to the primary-side first winding 202a. Since both ends of the primary-side first arm circuit 207 are connected to the first input and output port 60a, a step-up/down circuit is disposed between the terminal 616 of the second input and output port 60c and the first input and output port 60a.

The terminal 616 of the second input and output port 60c is connected to the midpoint 211m of the primary-side second arm circuit 211 via the primary-side second winding 202b and the primary-side second reactor 204b connected in series to the primary-side second winding 202b. Since both ends of the primary-side second arm circuit 211 are connected to the first input and output port 60a, a step-up/down circuit is disposed in parallel between the terminal 616 of the second input and output port 60c and the first input and output port 60a. Since the secondary-side conversion circuit 30 has substantially the same configuration as the primary-side conversion circuit 20, two step-up/down circuits are connected in parallel between the terminal 622 of the fourth input and output port 60d and the third input and output port 60b. Accordingly, the secondary-side conversion circuit 30 has a step-up/down function similarly to the primary-side conversion circuit 20.

The function as the DC-DC converter circuit of the power supply circuit 10 will be described below in detail. Paying attention to the first input and output port 60a and the third input and output port 60b, the first input and output port 60a is connected to the primary-side full-bridge circuit 200 and the third input and output port 60b is connected to the secondary-side full-bridge circuit 300. The primary-side coil 202 disposed in the bridge part of the primary-side full-bridge circuit 200 and the secondary-side coil 302 disposed in the bridge part of the secondary-side full-bridge circuit 300 are magnetically coupled to each other with a coupling coefficient kT, whereby the transformer 400 serves as a center-tap transformer with a turns ratio of 1:N. Accordingly, by adjusting the phase difference φ of the periodic switching movements of the switching elements of the primary-side full-bridge circuit 200 and the secondary-side full-bridge circuit 300, the electric power input to the first input and output port 60a can be converted and transmitted to the third input and output port 60b, or the electric power input to the third input and output port 60b can be converted and transmitted to the first input and output port 60a.

Figure 3:
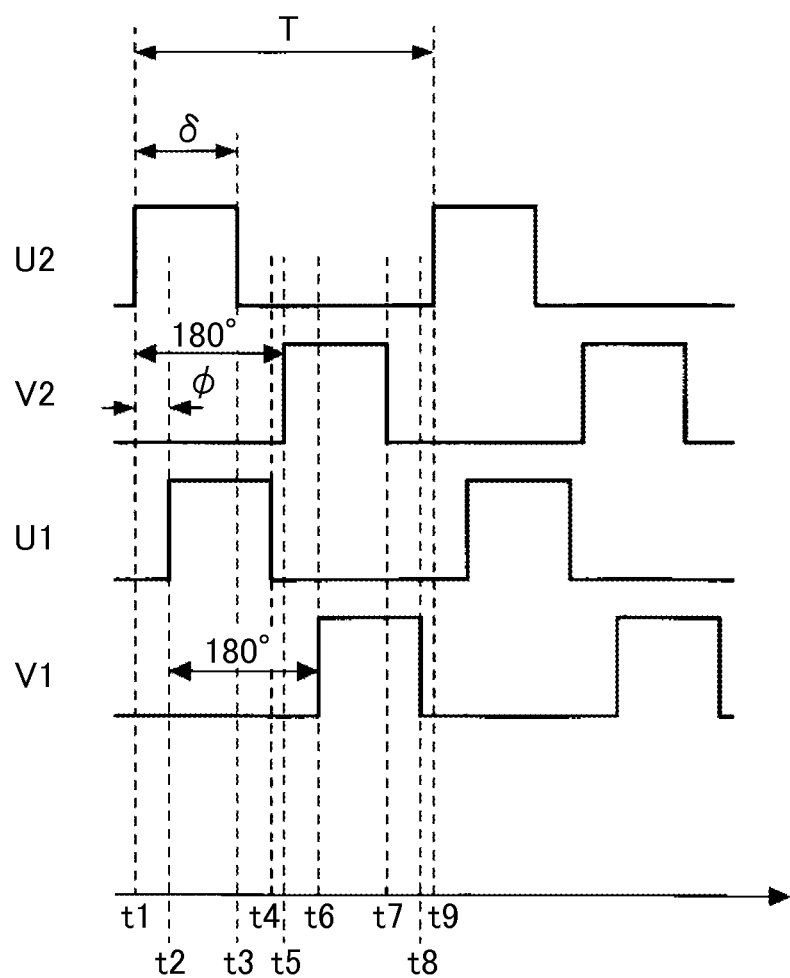
FIG. 3 is a timing diagram illustrating a switching example of a primary-side circuit and a secondary-side circuit.

FIG. 3 is a diagram illustrating ON-OFF switching waveforms of the arms disposed in the power supply circuit 10 under the control of the control unit 50. In FIG. 3, U1 represents the ON-OFF waveform of the primary-side first upper arm U1, V1 represents the ON-OFF waveform of the primary-side second upper arm V1, U2 represents the ON-OFF waveform of the secondary-side first upper arm U2, and V2 represents the ON-OFF waveform of the secondary-side second upper arm V2. The ON-OFF waveforms of the primary-side first lower arm /U1, the primary-side second lower arm /V1, the secondary-side first lower arm /U2, and the secondary-side second lower arm /V2 are waveforms (not illustrated) obtained by inverting the ON-OFF waveforms of the primary-side first upper arm U1, the primary-side second upper arm V1, the secondary-side first upper arm U2, and the secondary-side second upper arm V2, respectively. A dead time can be disposed between both ON and OFF waveforms of the upper and lower arms so that a penetration current does not flow at the time turning on both of the upper and lower arms. In FIG. 3, the high level represents the ON state and the low level represents the OFF state.

By changing the on-times δ of U1, V1, U2, V2, it is possible to change the step-up/down ratio of the primary-side conversion circuit 20 and the secondary-side conversion circuit 30. For example, by setting the on-times δ of the U1, V1, U2, V2 to be equal to each other, the step-up/down ratio of the primary-side conversion circuit 20 and the step-up/down ratio of the secondary-side conversion circuit 30 can be set to be equal to each other.

The on-time δ determining unit 506 sets the on-times δ of U1, V1, U2, V2 to be equal to each other so that the step-up/down ratios of the primary-side conversion circuit 20 and the secondary-side conversion circuit 30 are equal to each other (on-time δ=primary-side on-time δ11=secondary-side on-time δ12=time value β).

The step-up/down ratio of the primary-side conversion circuit 20 is determined depending on the duty ratio D which is the ratio of the on-time δ to the switching period T of the switching element (arm) disposed in the primary-side full-bridge circuit 200. Similarly, the step-up/down ratio of the secondary-side conversion circuit 30 is determined depending on the duty ratio D which is the ratio of the on-time δ to the switching period T of the switching element (arm) disposed in the secondary-side full-bridge circuit 300. The step-up/down ratio of the primary-side conversion circuit 20 is a transformation ratio between the first input and output port 60a and the second input and output port 60c, and the step-up/down ratio of the secondary-side conversion circuit 30 is a transformation ratio between the third input and output port 60b and the fourth input and output port 60d.

Accordingly, for example, step-up/down ratio of the primary-side conversion circuit 20=voltage of the second input and output port 60c/voltage of the first input and output port 60a=δ11/T=βT and step-up/down ratio of the secondary-side conversion circuit 30=voltage of the fourth input and output port 60d/voltage of the third input and output port 60b=δ12/T=βT are established. That is, the step-up/down ratio of the primary-side conversion circuit 20 and the step-up/down ratio of the secondary-side conversion circuit 30 have the same value (=β/T).

The on-time δ illustrated in FIG. 3 represents the on-time δ11 of the primary-side first upper arm U1 and the primary-side second upper arm V1, and represents the on-time δ12 of the secondary-side first upper arm U2 and the secondary-side second upper arm V2. The switching period T of the arm disposed in the primary-side full-bridge circuit 200 and the switching period T of the arm disposed in the secondary-side full-bridge circuit 300 are the same time.

The phase difference between U1 and V1 is set to 180 degrees (π) and the phase difference between U2 and V2 is set to 180 degrees (π). By changing the phase difference φ between U1 and U2, it is possible to adjust the amount of power transmitted P between the primary-side conversion circuit 20 and the secondary-side conversion circuit 30. The electric power can be transmitted from the primary-side conversion circuit 20 to the secondary-side conversion circuit 30 when the phase difference φ>0 is established, and the electric power can be transmitted from the secondary-side conversion circuit 30 to the primary-side conversion circuit 20 when the phase difference φ<0 is established.

The phase difference φ is a difference in switching timing (time lag) between the power conversion circuit units of the same phase in the primary-side full-bridge circuit 200 and the secondary-side full-bridge circuit 300. For example, the phase difference φ is a difference in switching timing between the primary-side first arm circuit 207 and the secondary-side first arm circuit 307, and is a difference in switching timing between the primary-side second arm circuit 211 and the secondary-side second arm circuit 311. The differences are controlled to the same state. That is, the phase difference φ between U1 and U2 and the phase difference φ between V1 and V2 are controlled to the same value.

Therefore, for example, when an external signal for requiring for selecting mode F as the power conversion mode of the power supply circuit 10 is input, the power conversion mode determining unit 502 determines that mode F is selected. The on-time δ determining unit 506 sets the on-time δ for defining the step-up ratio when the primary-side conversion circuit 20 is caused to serve as a step-up circuit stepping up the voltage input to the second input and output port 60c and outputs the stepped-up voltage to the first input and output port 60a. The secondary-side conversion circuit 30 serves as a step-down circuit stepping down the voltage input to the third input and output port 60b at the step-down ratio defined by the on-time δ set by the on-time δ determining unit 506 and outputting the stepped-down voltage to the fourth input and output port 60d. The phase difference φ determining unit 504 sets the phase difference φ for transmitting the electric power input to the first input and output port 60a to the third input and output port 60b by a desired amount of power transmitted P.

The primary-side switching unit 508 controls the switching of the switching elements of the primary-side first upper arm U1, the primary-side first lower arm /U1, the primary-side second upper arm V1, and the primary-side second lower arm /V1 so that the primary-side conversion circuit 20 serves as a step-up circuit and the primary-side conversion circuit 20 serves as a part of the DC-DC converter circuit.

The secondary-side switching unit 510 controls the switching of the switching elements of the secondary-side first upper arm U2, the secondary-side first lower arm /U2, the secondary-side second upper arm V2, and the secondary-side second lower arm /V2 so that the secondary-side conversion circuit 30 serves as a step-down circuit and the secondary-side conversion circuit 30 serves as a part of the DC-DC converter circuit.

As described above, the primary-side conversion circuit 20 and the secondary-side conversion circuit 30 can serve as a step-up circuit or a step-down circuit and the power supply circuit 10 can serve as a bidirectional DC-DC converter circuit. Accordingly, the power conversion can be performed in all the power conversion modes A to L, that is, the power conversion can be performed between two selected input and output ports out of four input and output ports.

The transmission power P (also referred to as amount of power transmitted P) adjusted depending on the phase difference φ, equivalent inductance L, and the like by the control unit 50 is electric power transmitted from one conversion circuit of the primary-side conversion circuit 20 and the secondary-side conversion circuit 30 to the other conversion circuit via the transformer 400, and is expressed by Expression (1), $$P=(N \times Va \times Vb)/(\pi \times \omega \times L) \times F(D,\phi).$$

Here, N represents the turns ratio of the transformer 400, Va represents the input and output voltage of the first input and output port 60a (the voltage between the primary-side positive bus bar 298 and the primary-side negative bus bar 299 of the primary-side conversion circuit 20), and Vb represents the input and output voltage of the third input and output port 60b (the voltage between the secondary-side positive bus bar 398 and the secondary-side negative bus bar 399 of the secondary-side conversion circuit 30). π represents the circular constant and ω(=2πxf=2π/T) represents the angular frequency of the switching of the primary-side conversion circuit 20 and the secondary-side conversion circuit 30. f represents the switching frequency of the primary-side conversion circuit 20 and the secondary-side conversion circuit 30, T represents the switching period of the primary-side conversion circuit 20 and the secondary-side conversion circuit 30, and L represents the equivalent inductance associated with the transmission of electric power of the magnetic coupling reactors 204, 304 and the transformer 400. F(D, φ) is a function having the duty ratio D and the phase difference φ as parameters and is a parameter monotonously increasing with the increase in the phase difference φ without depending on the duty ratio D. The duty ratio D and the phase difference φ are control parameters designed to vary within a range of predetermined upper and lower limits.

The equivalent inductance L can be defined in an equivalent circuit of the transformer 400 connected to the primary-side magnetic coupling reactor 204 and/or the secondary-side magnetic coupling reactor 304. The equivalent inductance L is combined inductance obtained by combining leakage inductance of the primary-side magnetic coupling reactor 204 and/or the leakage inductance of the secondary-side magnetic coupling reactor 304 and the leakage inductance of the transformer 400 in the simple equivalent circuit.

For example, the equivalent inductance L (secondary-side converted value $L_{EQ2}$) measured from the secondary-side conversion circuit 30 can be expressed by Expression (2), $$L_{EQ2}=2L_1(1-k_1)N^2+2L_2(1-k_2)+L_{T2}(1-k_T^2).$$

$L_1$ represents the self inductance of the primary-side magnetic coupling reactor 204, $k_1$ represents the coupling coefficient of the primary-side magnetic coupling reactor 204, N represents the turns ratio of the transformer 400, $L_2$ represents the self inductance of the secondary-side magnetic coupling reactor 304, $k_2$ represents the coupling coefficient of the secondary-side magnetic coupling reactor 304, $L_{T2}$ represents the exciting inductance on the secondary side of the transformer 400, and $k_T$ represents the coupling coefficient of the transformer 400. When the second input and output port 60c or the fourth input and output port 60d is not used, the leakage inductance appearing in the first term or the second term in Expression (2) may be absent.

The control unit 50 adjusts the transmission power P by changing the phase difference φ so that the port voltage Vp of at least one port of the primary-ports and the secondary-ports converges on a target port voltage Vo. Accordingly, even when the current consumption of a load connected to the port increases, the control unit 50 can prevent the port voltage Vp from departing from the target port voltage Vo by changing the phase difference φ to adjust the transmission power P.

For example, the control unit 50 adjusts the transmission power P by changing the phase difference φ so that the port voltage Vp of the other port as the transmission destination of the transmission power P out of the primary-side ports and the secondary-side ports converge on the target port voltage Vo. Accordingly, even when the current consumption of a load connected to the port as the transmission destination of the transmission power P increases, the control unit 50 can prevent the port voltage Vp from departing from the target port voltage Vo by increasing the phase difference φ to adjust the transmission power P.

Figure 4:
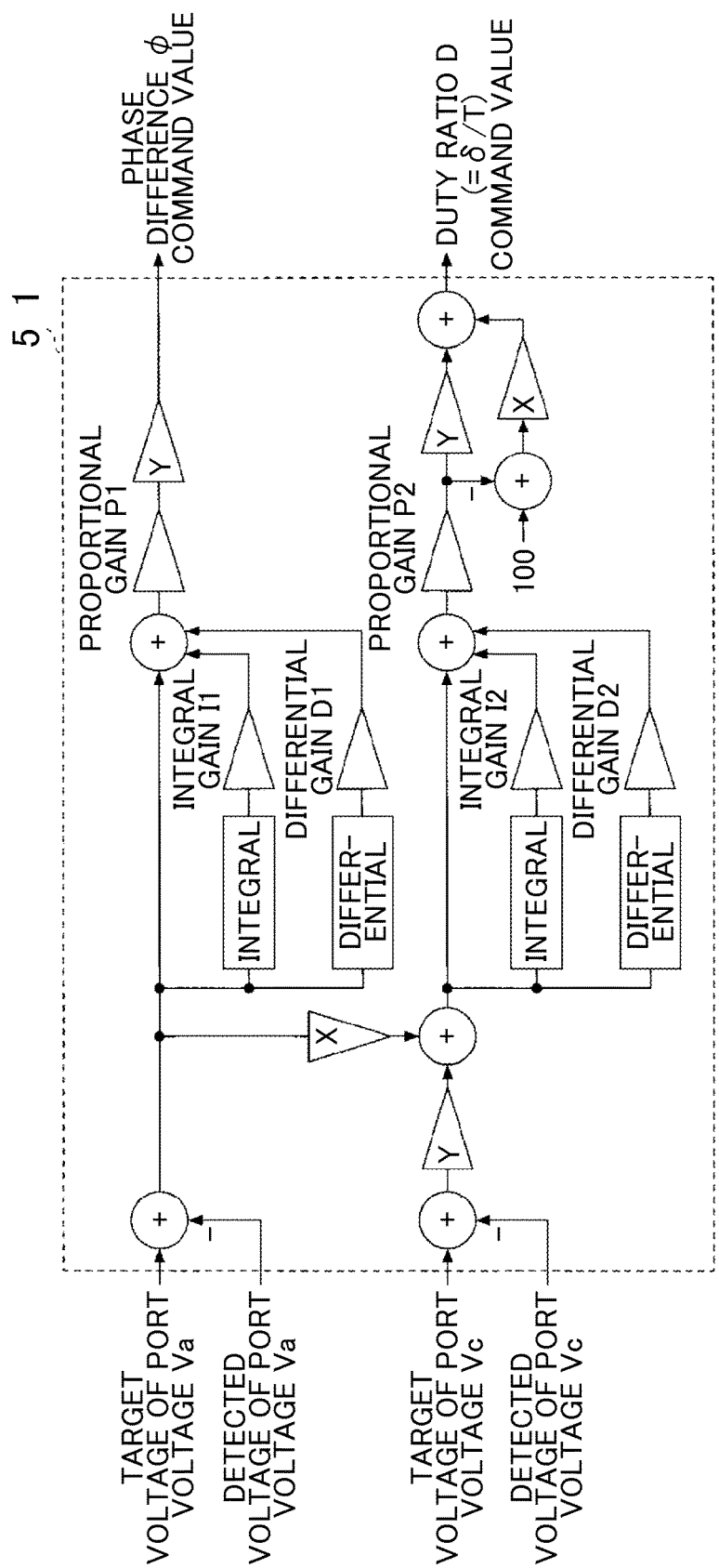
FIG. 4 is a block diagram illustrating a configuration example of a control unit.

FIG. 4 is a block diagram illustrating a first configuration example of the control unit 50. The control unit 50 includes a PID control unit 51.

The PID control unit 51 includes a phase difference command value generator that generates a command value φo of the phase difference φ for causing the port voltage of at least one port out of the primary-side ports and the secondary-side ports to converge on the target voltage by PID control for each switching period T. For example, the phase difference command value generator of the PID control unit 51 generates a command value φo for causing the difference to converge on zero for each switching period T by performing the PID control on the basis of the difference between the target voltage of the port voltage Va and the detected voltage of the port voltage Va acquired by the sensor unit 70.

The control unit 50 adjusts the transmission power P determined by Expression (1) by performing the switching control of the primary-side conversion circuit 20 and the secondary-side conversion circuit 30 on the basis of the command value φo generated by the PID control unit 51 so that the port voltage converges on the target voltage.

The PID control unit 51 includes a duty ratio value generator that generates a command value Do of the duty ratio D for causing the port voltage of at least one port out of the primary-side ports and the secondary-side ports to converge on the target voltage by the PID control for each switching period T. For example, the duty ratio command value generator of the PID control unit 51 generates a command value Do for causing the difference to converge on zero for each switching period T by performing the PID control on the basis of the difference between the target voltage of the port voltage Vc and the detected voltage of the port voltage Vc acquired by the sensor unit 70.

The PID control unit 51 may include an on-time command value generator generating a command value δo of the on-time δ instead of the command value Do of the duty ratio D.

The PID control unit 51 adjusts the command value φo of the phase difference φ on the basis of an integral gain I1, a differential gain D1, and a proportional gain P1, and adjusts the command value Do of the duty ratio D on the basis of an integral gain I2, a differential gain D2, and a proportional gain P2.

For example, when the control parameters in the PID control unit 51 are set to x=0 and y=1 (see FIG. 4), the primary-side first upper arm U1 ad the primary-side second upper arm V1 in the primary-side conversion circuit 20 are controlled to the switching waveform illustrated in FIG. 3. The secondary-side first upper arm U2 and the secondary-side second upper arm V2 in the secondary-side conversion circuit 30 are controlled to the switching waveforms illustrated in FIG. 3.

For example, when the control parameters in the PID control unit 51 are set to x=1 and y=0 (see FIG. 4), the primary-side first upper arm U1 ad the primary-side second upper arm V1 in the primary-side conversion circuit 20 are controlled to the switching waveform illustrated in FIG. 3. The secondary-side first upper arm U2 and the secondary-side second upper arm V2 in the secondary-side conversion circuit 30 are controlled to switching waveforms obtained by fixing the switching waveforms illustrated in FIG. 3 to the OFF state.

A relationship of port voltage Va×duty ratio D=port voltage Vc is established among the port voltage Va, the port voltage Vc, and the duty ratio D. Accordingly, when it is wanted to step down the constant port voltage Va (for example, 10 V) to increase the port voltage Vc (for example, from 1 V to 5 V), the duty ratio D can be increased (for example, from 10% to 50%). On the contrary, when it is wanted to step up the constant port voltage Vc (for example, 5 V) to increase the port voltage Va (for example, from 10 V to 50 V), the duty ratio D can be decreased (for example, from 50% to 10%). That is, the PID control unit 51 inverts the control direction of the duty ratio D (the direction in which the duty ratio D increases or decreases) in the step-up operation and the step-down operation by changing the values of the control parameters x, y to switch the control target (the first input and output port 60a or the second input and output port 60c).

Operation Flow of Power Supply Device 101

Figure 5:
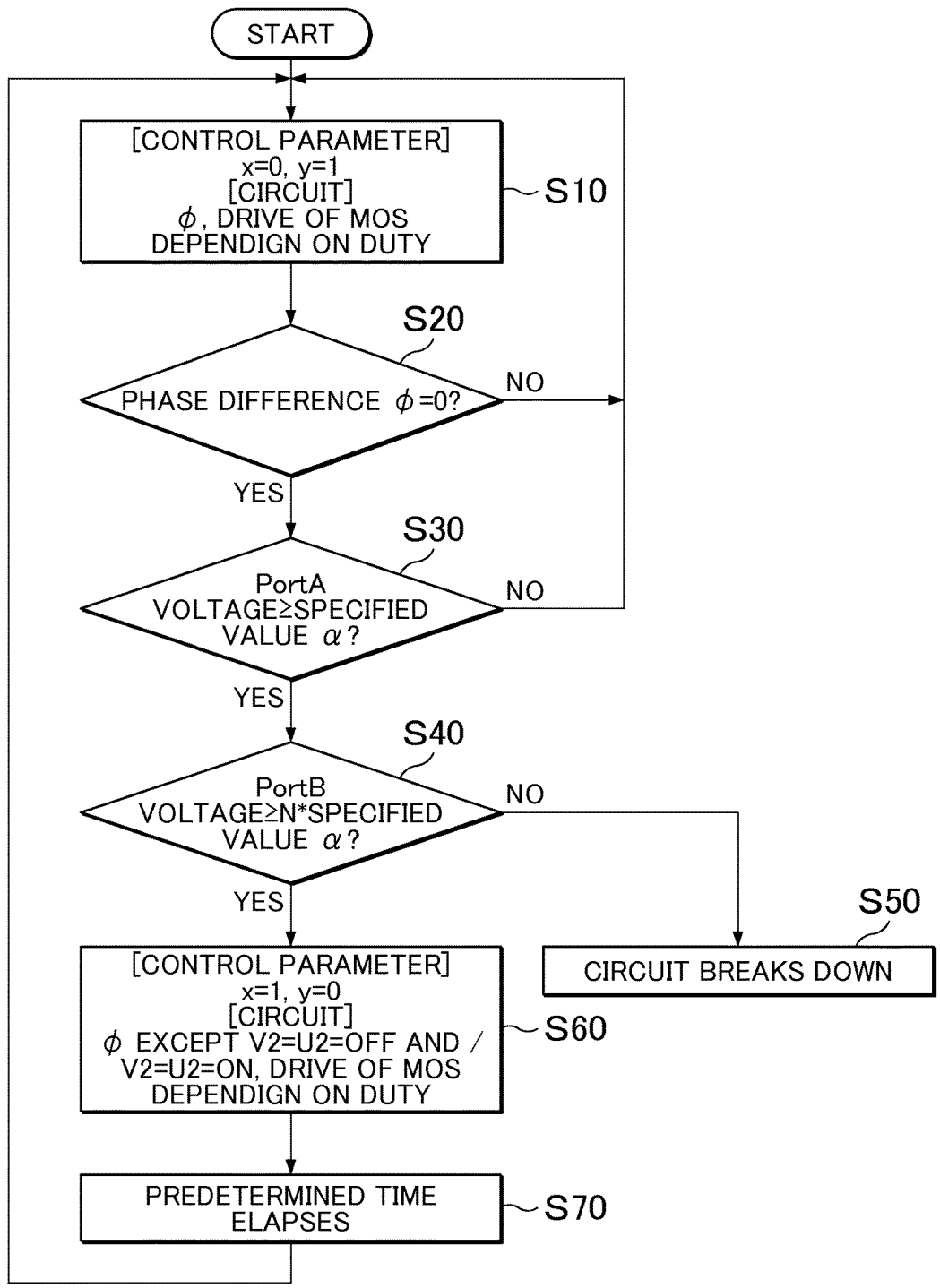
FIG. 5 is a diagram illustrating an example of a power conversion method.

FIG. 5 is a flowchart illustrating an example of the power conversion method. The power conversion method illustrated in FIG. 5 is performed by the control unit 50.

In step S10, the control unit 50 sets the control parameters to x=0 and y=1 and controls the driving of the arms (the primary-side first upper arm U1, the primary-side second upper arm V1, the secondary-side first upper arm U2, the secondary-side second upper arm V2, the primary-side first lower arm /U1, the primary-side second lower arm /V1, the secondary-side first lower arm /U2, and the secondary-side second lower arm /V2) on the basis of the phase difference ϕ and the duty ratio D. The duty ratio D is set so as to perform the step-down operation from the first input and output port 60a to the second input and output port 60c.

The ON-Off timing of each arm can be referred to the timing chart of the switching waveforms illustrated in FIG. 3. The ON-OFF waveforms of the primary-side first lower arm /U1, the primary-side second lower arm /V1, the secondary-side first lower arm /U2, and the secondary-side second lower arm /V2 are waveforms obtained by inverting the ON-OFF waveforms of the primary-side first upper arm U1, the primary-side second upper arm V1, the secondary-side first upper arm U2, and the secondary-side second upper arm V2, respectively.

In step S20, the control unit 50 determines whether the phase difference ϕ is zero (0). When the phase difference ϕ is 0 (YES), the control unit 50 causes the operation flow to go to step S30. When the phase difference ϕ is not 0 (NO), the control unit 50 returns the operation flow to step S10.

By the determination of step S20, the control unit 50 can determine whether the power supply circuit 10 is in a no-load state (a current does not flow in the first input and output port 60a and the second input and output port 60c). In the determination of whether the phase difference ϕ is zero, zero includes a value of zero and a value very close to zero.

In step S30, the control unit 50 determines whether the port voltage Va is equal to or greater than a specified value α (first specified value). When the port voltage Va is equal to or greater than the specified value α (YES), the control unit 50 causes the operation flow to step S40. When the port voltage Va is not greater than the specified value α (NO), the control unit 50 returns the operation flow to step S10. The specified value α is, for example, the target voltage of the port voltage Va.

By the determination of step S30, the control unit 50 can determine whether the port voltage Va departs from the specified value α even in the no-load state (ϕ=0).

In step S40, the control unit 50 determines whether the port voltage Vb is greater than the product (second specified value) of the turns ratio N of the transformer 400 and the specified value α. When the port voltage Vb is greater than the product of the turns ratio N of the transformer 400 and the specified value α (YES), the control unit 50 causes the operation flow to go to step S60. When the port voltage Vb is not greater than the product (second specified value) of the turns ratio N of the transformer 400 and the specified value α (NO), the control unit 50 causes the operation flow to step S50. When the turns ratio N of the transformer 400 is equal to or greater than 1, a relationship of second specified value≥first specified value is established.

By the determination of step S40, the control unit 50 can determine whether the relationship between the turns ratio N and the voltage ratio M collapses, and can determine whether to stop the transmission of electric power from the secondary-side conversion circuit to the primary-side conversion circuit, which occurs by the collapsing of the relationship between the turns ratio N and the voltage ratio M.

In step S50, the control unit 50 determines that the power conversion device is in a breakdown state when the phase difference ϕ is zero, the port voltage Va is equal to or greater than the first specified value, and the port voltage Vb is equal to or less than the second specified value. Examples of the breakdown state include an uncontrollable error of a MOSFET, abnormality of an output voltage, a breakdown of the primary-side (secondary-side) circuit, a circuit breakdown, and a breakdown of a transformer.

In step S60, the control unit 50 sets the control parameters to x=1 and y=0, and controls the driving of each arm on the basis of the phase difference ϕ and the duty ratio D. The ON-OFF waveforms of the secondary-side first upper arm U2 and the secondary-side second upper arm V2 are waveforms (not illustrated) obtained by fixing the ON-OFF waveforms of the secondary-side first upper arm U2 and the secondary-side second upper arm V2 to the OFF state in the switching waveforms illustrated in FIG. 3. The ON-OFF waveforms of the secondary-side first lower arm /U2 and the secondary-side second lower arm /V2 are waveforms (not illustrated) obtained by fixing the ON-OFF waveforms in the drawing to the ON state. The ON-OFF waveforms of the primary-side first upper arm U1 and the primary-side second upper arm V1 are the switching waveforms illustrated in FIG. 3. The ON-OFF waveforms of the primary-side first lower arm /U1 and the primary-side second lower arm /V1 are waveforms (not illustrated) obtained by inverting the ON-OFF waveforms of the primary-side first upper arm U1 and the primary-side second upper arm V1 in the switching waveforms illustrated in FIG. 3.

In step S60, in order to supply the electric power of the primary-side conversion circuit 20, the control unit 50 switches the step-down operation from the first input and output port 60a to the second input and output port 60c to the step-up operation from the second input and output port 60c to the first input and output port 60a. That is, by inverting the control direction of the duty ratio D under the control of the control unit 50, it is possible to increase the port voltage Va of the first input and output port 60a or to keep the port voltage Va constant. At this time, the primary-side low-voltage power supply 62c (auxiliary battery) is used, but the no-load state is premised and it is thus possible to prevent an increase in power consumption.

The gain directions in step S10 and step S60 are opposite to each other, but the duty ratio D is appropriately controlled by the subtraction operation in the final stage of the PID control unit 51.

In step S70, the control unit 50 returns the operation flow to step S10 after a predetermined time elapses.

As described above, the control unit 50 determines whether the phase difference φ is zero (0) through the control of step S20, determines whether the port voltage Va is equal to or greater than the specified value α through the control of step S30, and determines whether the port voltage Vb is greater than the product of the turns ratio n of the transformer 400 and the specified value α through the control of step S40. When the phase difference φ is zero, the port voltage Va is equal to or greater than the specified value α, and the port voltage Vb is greater than the product of the turns ratio n and the specified value α, the control unit 50 stops the transmission of electric power from the secondary-side conversion circuit 30 to the primary-side conversion circuit 20. Accordingly, the power supply device 101 can prevent the port voltage Va from departing from the specified value.

When the transmission of electric power from the secondary-side conversion circuit 30 to the primary-side conversion circuit 20 is stopped, the control unit 50 switches the step-down operation from the first input and output port 60a to the second input and output port 60c to the step-up operation from the second input and output port 60c to the first input and output port 60a. Accordingly, the power supply device 101 can prevent the port voltage Va from decreasing due to the self discharging or the like.

While the power conversion device and the power conversion method have been described with reference to the embodiment, the invention is not limited to the aforementioned embodiment. Various modifications and improvements such as combination or replacement of a part or all of other embodiments can be made without departing from the scope of the invention.

For example, in the aforementioned embodiment, a MOSFET as a semiconductor element that is turned on or off has been used as an example of the switching element. However, the switching element may be a voltage-controller power element using an insulating gate such as an IGBT or a MOSFET or may be a bipolar transistor.

A power supply may be connected to the first input and output port 60a or a power supply may be connected to the fourth input and output port 60d.

The secondary side may be defined as the primary side and the primary side may be defined as the secondary side.

The invention can be applied to a power conversion device that includes three or more input and output ports and that can convert electric power between two input and output ports out of the three or more input and output ports. For example, the invention can be applied to a power supply device having a configuration in which any one input and output port out of four input and output ports illustrated in FIG. 1 is removed.

What is claimed is:

1. A power conversion method of a power conversion device including a primary-side port disposed in a primary-side circuit and a secondary-side port disposed in a secondary-side circuit magnetically coupled to the primary-side circuit with a transformer, the power conversion device adjusting transmission power by changing a phase difference between switching of the primary-side circuit and switching of the secondary-side circuit, the transmission power being transmitted between the primary-side circuit and the secondary-side circuit, the power conversion method comprising:

determining whether the phase difference is zero;
determining whether a voltage of the primary-side port is equal to or greater than a first specified value;
determining whether a voltage of the secondary-side port is greater than a second specified value; and
stopping transmission of electric power from the secondary-side circuit to the primary-side circuit when the phase difference is zero, the voltage of the primary-side port is equal to or greater than the first specified value, and the voltage of the secondary-side port is greater than the second specified value such that the power conversion method prevents the voltage of the primary-side port from departing from a specified value,
wherein the second specified value is a product of a turns ratio of the transformer and the first specified value or a product of a turns ratio of the transformer and a target voltage of the first primary-side port.

2. The power conversion method according to claim 1, wherein the primary-side circuit includes a first primary-side port and a second primary-side port,
wherein the secondary-side circuit includes a secondary-side first upper arm, a secondary-side second upper arm, a secondary-side first lower arm, and a secondary-side second lower arm, and
wherein the secondary-side first upper arm and the secondary-side second upper arm are turned off and the secondary-side first lower arm and the secondary-side second lower arm are turned on when the phase difference is zero, the voltage of the primary-side port is equal to or greater than the first specified value, and the voltage of the secondary-side port is greater than the second specified value.

3. The power conversion method according to claim 1, wherein the primary-side circuit includes a first primary-side port and a second primary-side port,
wherein a step-down operation from the first primary-side port to the second primary-side port is switched to a step-up operation from the second primary-side port to the first primary-side port when the transmission of electric power from the secondary-side circuit to the primary-side circuit is stopped.

4. The power conversion method according to claim 1, wherein it is determined that the power conversion device breaks down when the phase difference is zero, the voltage of the primary-side port is equal to or greater than the first specified value, and the voltage of the secondary-side port is equal to or less than the second specified value.

5. The power conversion method according to claim 1, wherein the second specified value is greater than the first specified value.

6. The power conversion method according to claim 1, wherein the transformer serves as a center-tap transformer.

7. The power conversion method according to claim 1, wherein the primary-side circuit includes a first primary-side port and a second primary-side port, and
wherein a step-down operation from the first primary-side port to the second primary-side port is switched to a step-up operation from the second primary-side port to the first primary-side port to prevent the voltage of the primary-side port from decreasing due to self-discharging.

8. A power conversion device comprising:
a primary-side circuit including a primary-side port;
a secondary-side circuit including a secondary-side port and being magnetically coupled to the primary-side circuit with a transformer; and a control unit controlling transmission power transmitted between the primary-side circuit and the secondary-side circuit by changing a phase difference between switching of the primary-side circuit and switching of the secondary-side circuit, wherein the control unit is configured to determine whether the phase difference is zero;

determine whether a voltage of the primary-side port is equal to or greater than a first specified value;

determine whether a voltage of the secondary-side port is greater than a second specified value; and stop transmission of electric power from the secondary-side circuit to the primary-side circuit when the phase difference is zero, the voltage of the primary-side port is equal to or greater than the first specified value, and the voltage of the secondary-side port is greater than the second specified value such that the power conversion method prevents the voltage of the primary-side port from departing from a specified value, wherein the second specified value is a product of a turns ratio of the transformer and the first specified value or a product of a turns ratio of the transformer and a target voltage of the first primary-side port.

9. The power conversion device according to claim 8, wherein the primary-side circuit includes a first primary-side port and a second primary-side port, wherein the secondary-side circuit includes a secondary-side first upper arm, a secondary-side second upper arm, a secondary-side first lower arm, and a secondary-side second lower arm, and wherein the control unit is configured to turn off the secondary-side first upper arm and the secondary-side second upper arm and to turn on the secondary-side first lower arm and the secondary-side second lower arm when the phase difference is zero, the voltage of the primary-side port is equal to or greater than the first specified value, and the voltage of the secondary-side port is greater than the second specified value.

10. The power conversion device according to claim 8, wherein the primary-side circuit includes a first primary-side port and a second primary-side port, wherein the control unit is configured to switch a step-down operation from the first primary-side port to the second primary-side port to a step-up operation from the second primary-side port to the first primary-side port when the transmission of electric power from the secondary-side circuit to the primary-side circuit is stopped.

11. The power conversion device according to claim 8, wherein the control unit is configured to determine that the power conversion device breaks down when the phase difference is zero, the voltage of the primary-side port is equal to or greater than the first specified value, and the voltage of the secondary-side port is equal to or less than the second specified value.

12. The power conversion device according to claim 8, wherein the second specified value is greater than the first specified value.

13. The power conversion method according to claim 8, wherein the transformer serves as a center-tap transformer.

14. The power conversion method according to claim 8, wherein the primary-side circuit includes a first primary-side port and a second primary-side port, and wherein a step-down operation from the first primary-side port to the second primary-side port is switched to a step-up operation from the second primary-side port to the first primary-side port to prevent the voltage of the primary-side port from decreasing due to self-discharging.

* * * * *